UNITED STATES PATENT OFFICE.

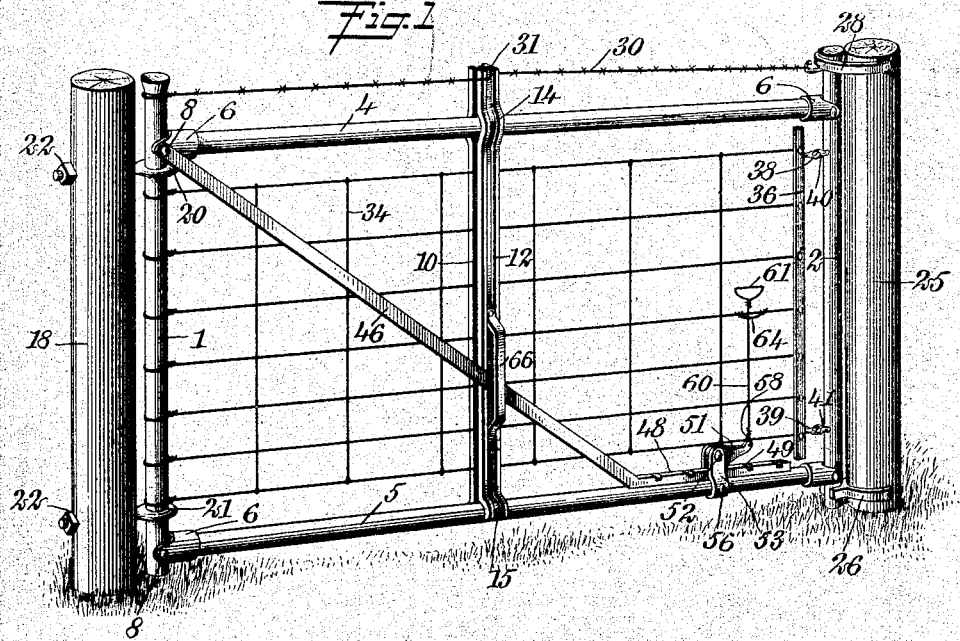
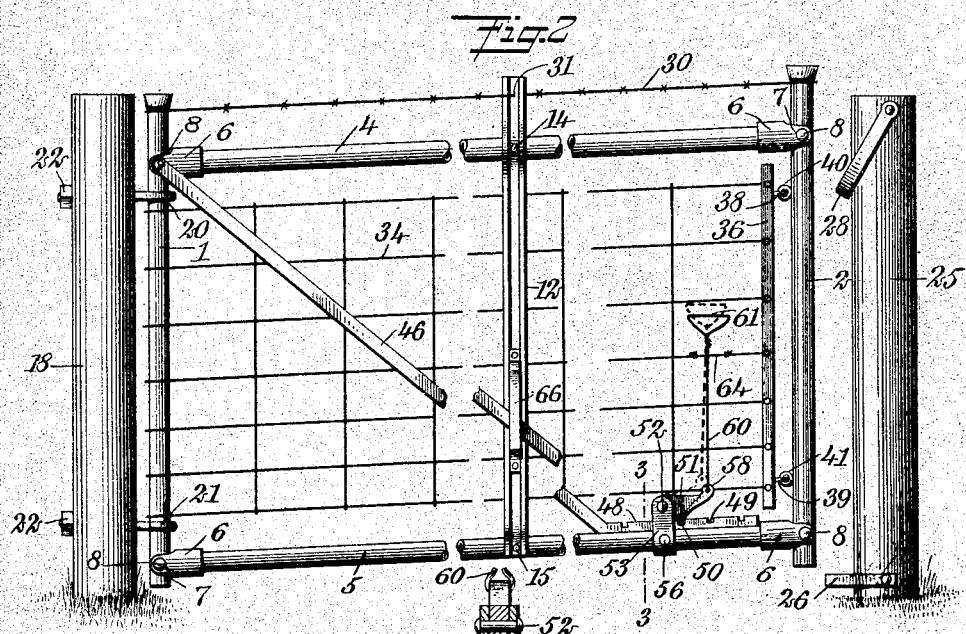

CHRISTOPHER A. EIDSMOE, OF BERESFORD, SOUTH DAKOTA.

GATE.

No. 918,981.      Specification of Letters Patent.      Patented April 20, 1909.

Application filed November 21, 1908. Serial No. 463,784.

*To all whom it may concern:*

Be it known that I, CHRISTOPHER A. EIDSMOE, a citizen of the United States, and a resident of Beresford, in the county of Union and State of South Dakota, have invented a new and Improved Gate, of which the following is a full, clear, and exact description.

This invention relates to gates, especially that class of gates adapted to be lifted vertically and adapted to be swung in both directions laterally.

One object of the invention is to provide a swinging gate which may be adjusted to any degree of inclination above or below the horizontal, and retained in such adjusted position.

A further object is to provide a gate comprising an adjustable frame, pivoted at one end to a post and having its free end adapted to be raised or lowered, and means for retaining the frame in its adjusted position.

A still further object is to provide a gate which may be adjusted to conform to any inclination of the ground above which it is mounted, and retained in such adjusted position, and also having means whereby the free end of the gate may be raised to clear a latch or any obstruction in the path of the gate.

Reference is to be had to the accompanying drawings forming a part of this specification, in which drawings like characters of reference indicate like parts throughout the views, and in which—

Figure 1 is a perspective view showing the gate in closed position; Fig. 2 is a front elevation, partly broken, showing the gate in a slightly raised position; and Fig. 3 is a vertical section on the line 3—3 of Fig. 2.

The frame of the gate comprises tubular end members 1 and 2 and tubular top and bottom members 4 and 5 respectively. At each end of the top and bottom members are sleeves 6 which are provided with ears 7. A bolt 8 is passed through the ears and through the tubular end members in order to form a pivotal connection between the end members and the top and bottom members. In long gates an additional supporting member may be provided, comprising oppositely disposed bars 10 and 12, which are pivoted at 14 and 15 to the top and bottom members 4 and 5 respectively.

The gate is supported from a post 18 which may be of ordinary construction, by means of eye-bolts 20 and 21 surrounding the end member 1 and passing through the post 18. Said eye-bolts are retained in position by means of nuts 22. The free end of the gate is adapted to coöperate with a post 25 having a yoke 26 secured to its lower end, which is adapted to receive the lower end of the member 2. A bail 28 is pivoted to the upper end of the post 25 and adapted to be slipped over the top of the member 2, as shown in Fig. 1. A strand of barbed wire 30 is rigidly connected between the members 1 and 2 at the top of the gate and passes through a hole 31 formed in each of the members 10 and 12. The body of the gate comprises a lattice work of wire strands 34, the horizontal members of which are secured at one end to the end frame member 1. The other ends of the horizontal strands of wire are secured to a bar 36. Eye-bolts 38, 39 are secured to the bar 36, and held by similar eye-bolts 40, 41 respectively, which are fastened to the end member 2. Said eye-bolts may be provided with adjusting means whereby the bar 36 may be drawn to keep the lattice work in proper tension. Said lattice work passes between the bars 10 and 12 of the stiffening member.

A supporting lever 46 is pivoted at one end about the bolt 8, which forms the pivotal connection of the left hand end of the top member 4 with the end member 1. The lower end of the lever 46 is bent to lie adjacent to the upper side of the lower frame member 5. This end of the lever is provided with a series of teeth 48 separated by notches 49. These notches are adapted to receive the lower end 50 of a bell crank lever 51 pivoted about a pin 52 which is supported in the ears 53 of a strap passing around the member 5, and secured thereto by means of a bolt or rivet 56 passing through said strap and said member 5.

Secured to the bell crank lever 51 at its upper end 58 is a wire 60 terminating at its upper end in a handle 61, said wire passing through a loop 64 formed upon one of the horizontal strands of the lattice work. The bell crank lever together with the teeth on the lifting lever, operates as a clutch to hold the frame work of the gate in any desired position, either above or below the horizontal. Said lifting lever 46 passes through a guiding strap 66 secured to the bar 12.

From the construction above set forth it will be understood that in order to open the gate from the position shown in Fig. 1, it is merely necessary to release the bail 28 from the end of the member 2. Then by raising the handle 61 to the dotted line position shown in Fig. 2, the end 50 of the bell crank lever will be withdrawn from the notch in which it has been resting while the gate is closed, and the lower end of the gate will be released from the yoke 26, whereupon the lower end of the lever 46 may slide along the member 5, and when the gate has been raised to the desired position the handle 61 may be released to allow the end 50 of the lever 51 to engage a notch in the lever 46. If it be desired to lower the gate, it is merely necessary to raise the handle 61 sufficiently to free the lever 46 and push the frame work downward, and then lock it in position similarly as above described.

It will be noted that the frame of the gate may be secured in any desired adjusted position, thus allowing it to be used upon inclined land.

In order to open the gate it is necessary to free the lower end from the yoke 26, whereupon the gate may be swung in any direction.

Having thus described my invention, what I claim as new and desire to secure by Letters Patent is:

1. In a gate, the combination of an adjustable swinging frame comprising end members and top and bottom members pivotally attached to said end members, a supporting lever pivoted at its upper end to said frame and having an offset portion at its other end resting upon said bottom member, a series of teeth on said offset portion, a lever mounted on said bottom member and having a projection adapted to engage the teeth on said offset portion, and a handle connected to said last-mentioned lever, whereby the latter may be tilted to free it from said teeth, whereupon the free end of said gate may be raised or lowered.

2. In a gate, the combination of an adjustable swinging frame, comprising end members and top and bottom members pivotally attached to said end members, a supporting lever pivoted at its upper end to said frame and having an offset portion at its lower end resting upon said bottom member, a series of teeth on said offset portion, a strap secured to said bottom member, a lever fulcrumed on said strap and having a projection adapted to engage the teeth on said offset portion, and a handle connected to said lever whereby the latter may be tilted to free it from said teeth, whereupon the free end of said gate may be raised or lowered.

3. In a gate, the combination of an adjustable tubular frame comprising end members and top and bottom members pivotally attached to said end members, a supporting lever pivoted at its upper end to said frame and having an offset portion at its lower end resting upon said bottom member, a series of teeth on said offset portion, a strap passing around said lower member and extending above the same on opposite sides of the offset portion of said supporting lever, a lever fulcrumed on said strap and having a projection adapted to engage the teeth on said offset portion, and a handle connected to said last-mentioned lever, whereby the latter may be tilted to free it from said teeth, whereupon the free end of said gate may be raised or lowered.

In testimony whereof I have signed my name to this specification in the presence of two subscribing witnesses.

CHRISTOPHER A. EIDSMOE.

Witnesses:
   A. F. CRANDALL,
   G. E. DAVIS.